Oct. 25, 1966 J. E. BRIDGES 3,281,766

COMMUNICATION SYSTEM

Filed July 16, 1965

Inventor.
Jack E. Bridges.
By. Hofgren, Brady, Wegner, Allen & Stellman
Attorneys.

United States Patent Office 3,281,766
Patented Oct. 25, 1966

3,281,766
COMMUNICATION SYSTEM

Jack E. Bridges, Park Ridge, Ill., assignor to Warwick Electronics Inc., a corporation of Delaware Filed July 16, 1965, Ser. No. 480,224
9 Claims. (Cl. 340—5)

This application is a continuation-in-part of my application Serial No. 165,534, filed January 11, 1962, now abandoned, and assigned to the assignee of this invention.

This invention relates to a communication system having a transmitter which generates an asymmetric signal and a receiver with a detector which suppresses symmetric interference signals.

The invention will be discussed as embodied in an underwater communication system.

Communication systems are often limited in usefulness by interference or noise signals which become mixed with the transmitted signal as it passes through a transmission medium. In the receiving apparatus of the system, highly sophisticated circuitry is sometimes provided to reduce the level of the interfering signals and enhance the desired signal so that it can be detected and understood. This problem is particularly acute in underwater communication systems utilizing an ultrasonic carrier signal.

In underwater communications, noise of a symmetric, often sinusoidal, character is established as a part of the general background or environmental noise of the medium, by propellers of ships, disturbances generated by crustacea, fish, porpoises and the like and by electronic equipment as sonar and fathometers.

An object of this invention is to provide an improved communication system utilizing an asymmetric or pulse-type signal and having a receiving circuit uniquely designed to receive such signal while discriminating against symmetric noise signals.

A further object of the invention is to provide a system including a transmitter in which are generated multiple signals having fixed frequency relationships and in which the receiving system has a pass band including each of the signals transmitted.

Another object of the invention is the provision of a detection system in which the output is enhanced by the presence of symmetric noise.

One feature of the invention is that the communication system includes means for generating an asymmetric signal, means for transmitting the generated signal through a medium subject to the occurrence of symmetric interference signals, means for receiving both the transmitted and the interference signals, a detector for the received signals including a bilateral element with a nonlinear resistance characteristic connected in series with an element having a linear resistance characteristic, and a low pass filter connected with the linear resistance element.

Another feature is that the asymmetric signal is generated by combining a plurality of sinusoidal signals at harmonically related frequencies; and that at least one of the signals is modulated.

A further feature is that the detector of the system includes a resistor which is nonlinear with respect to the voltage applied thereto, connected in series with the linear resistor and the low pass filter is connected in parallel with the linear resistor.

Further objects and advantages will become apparent from the following detailed description taken in connection with the accompanying drawings, in which.

Figure 1:
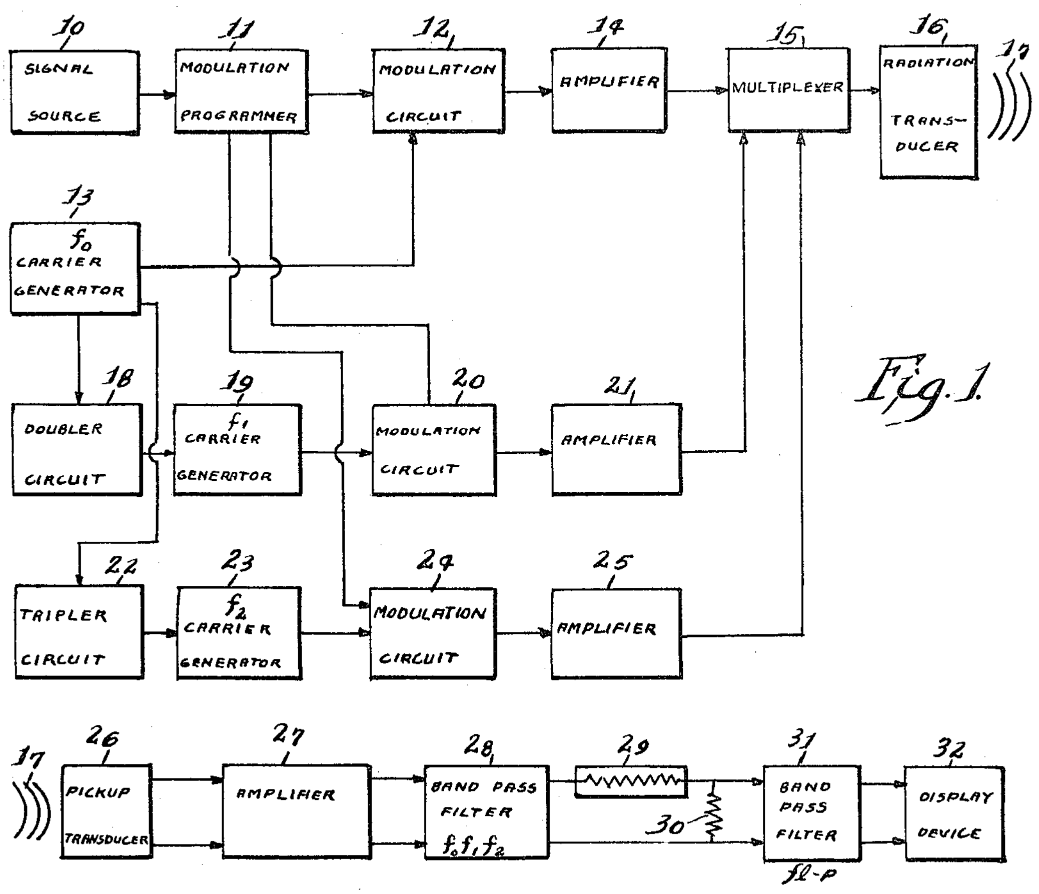
FIGURE 1 is a block diagram of a transmitter and receiver system embodying the invention.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Figures 2, 3, 4:
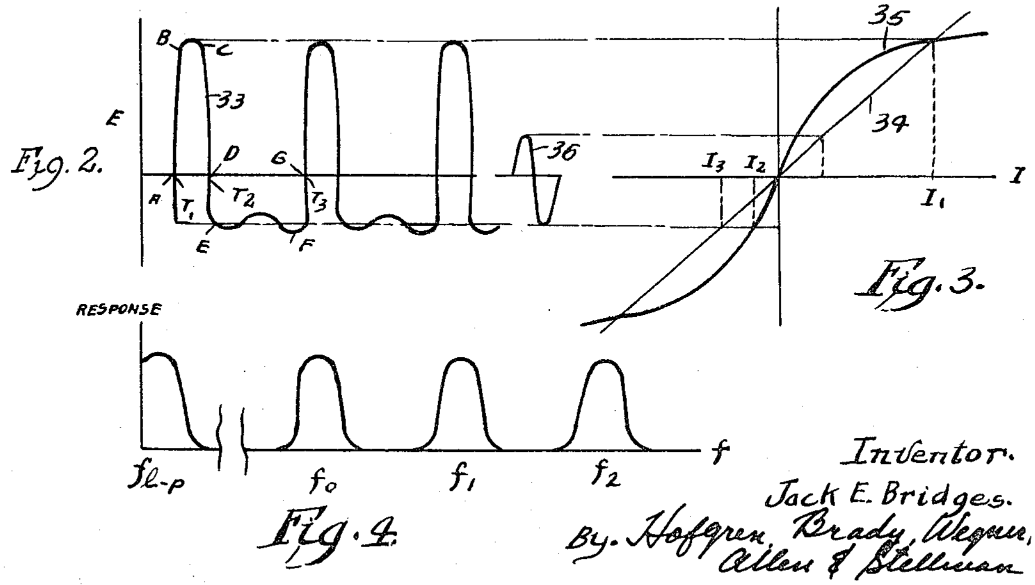
FIGURE 2 is a curve of the transmitted signal.
FIGURE 3 shows the voltage-current characteristics of a nonlinear symmetric resistor and a linear resistor.
FIGURE 4 shows the band pass characteristics of a portion of the receiver of the system in FIGURE 1.

The asymmetric signal transmitted in the embodiment of the invention illustrated herein is generated by combining three signals having harmonically related frequencies and a fixed phase relation. For example, a pulse signal such as the pulses illustrated in FIGURE 2 is established by combining three cosine waves representing a fundamental, second harmonic and third harmonic.

Turning now to FIGURE 1 of the drawings, the fundamental carrier signal, $f_0$, is provided by a carrier generator 13. Doubler 18 and tripler 22 are connected with generator 13 and establish second harmonic and third harmonic signals $f_1$ and $f_2$ to synchronize the second harmonic carrier generator 19 and third harmonic carrier generator 23.

A modulating signal is obtained from signal source 10 and coupled to a modulation programmer 11 which supplies modulating information to modulation circuits 12, 20 and 24 associated with the fundamental, second harmonic and third harmonic channels, respectively. Signal source 10 may provide intelligence information in any desired form. For example, analog information may be used directly to amplitude or frequency modulate one or more of the three carrier components.

Other forms of modulation may be used. The type of modulation selected may be affected by the nature of the modulating intelligence and the character of the transmission medium through which the signal is to be sent. The modulation programmer may be utilized to select one or more of the components of the transmitted signal for modulation. This provides a frequency diversity type transmission in which the appropriate frequency may be selected for maximum fidelity of the received information.

The three harmonically related signals, with such modulation as may be applied, are amplified in the amplifiers 14, 21 and 25 and combined in multiplexer 15. The combined signal is transmitted by radiation transducer 16, the signal 17 being coupled from the transducer into the transmitting medium, in this example water.

The receiver portion of the system includes a receiving transducer 26 which couples the transmitted signal 17 and noise which is present in the transmission medium to an amplifier 27. The amplified signal is coupled through a band pass filter 28 to a detector. The band pass filter has pass band characteristics such that it passes at least all of the component frequencies of the transmitted signal. These include $f_0$, $f_1$ and $f_2$, one or all modulated by the intelligence signal having an upper frequency of $f_{1-p}$. The signals having frequencies above $f_2$ and. in the illustrated case, between the various frequency bands, are attenuated.

The detector circuit connected with the output of band pass filter 28 includes a symmetric, nonlinear resistor 29, connected in series with the signal path and a linear resistor 30 connected in series with the nonlinear resistor and shunted across the signal path. The output of the detector is developed across linear resistor 30 and is coupled through a band pass filter 31, passing the low frequencies $f_{1-p}$, to a suitable display device 32, as an oscilloscope, a printer or a speaker.

The nonlinear resistor 29 has a current passing characteristic represented by the formula:

$$I=KV^n$$

where

K is a constant
V is the voltage, and
$n$ is an exponent greater than 1.

The operating characteristics of a non-linear resistor 29 are shown in FIGURE 3. The signal 33 of FIGURE 2 has a pulse shape having a zero D.C. average current. The positive pulses extend from time $T_1$ to $T_2$ which may be designated as an "on" time and from $T_2$ to $T_3$ designated as an "off" time. The average of these two pulses is zero as shown by the areas ABCD and DEFG which are equal. Hence, the signal has an average D.C. value of zero.

In FIGURE 3 a linear resistor's characteristics curve is shown by the line 34 and the characteristic of the nonlinear resistor 29 of FIGURE 1 is represented by the line 35 drawn to approximately the same scale. When a positive pulse 33 is received, a current $I_1$ will flow through resistor 29. If this signal were applied to a linear resistor during the negative portions of the signal, a current designated as $I_3$ would flow giving the average current of zero. However, as shown by FIGURE 3, when the signal is applied to the nonlinear resistor 29, a current $I_2$, considerably smaller than $I_3$, flows, and a resulting average D.C. current is developed through resistor 20. Thus, during the receipt of the desired signal, the detector develops a signal which is passed through the band pass filter 31 and an indication is given by display device 32.

Often noise signals are received by the system which are symmetrical about the zero axis as shown in FIGURE 2 by a sine wave 36. It is apparent that their average about zero axis would develop zero average current across either the linear or nonlinear resistors. The indicator or display device 23 would give no reading during receipt of a noise signal only. If the noise and transmitted signals are received together, the noise components enhance the output.

I claim:

1. A communication system comprising: means for generating an asymmetric pulse signal; means for transmitting said generated signal through a medium subject to the occurrence of symmetric interference signals; means for receiving said transmitted and interference signals; a detector for said received signals, including a bilateral element with a nonlinear resistance characteristic and an element having a linear resistance characteristic connected in series therewith; and a low pass filter connected with said linear resistance element.

2. The communication system of claim 1 including means for modulating said asymmetric signal.

3. The communication system of claim 1 wherein said means for generating an asymmetric signal includes means for generating a plurality of sinusoidal signals at harmonically related frequencies and means for combining said harmonically related signals to produce said asymmetric pulse signal.

4. The communication system of claim 3 including means for modulating at least one of said harmonically related sinusoidal signals.

5. The communication system of claim 3 wherein said harmonically related signals include fundamental, second harmonic and third harmonic cosine signals combined in an in phase condition.

6. The communication system of claim 1 wherein said detector includes a resistor nonlinear with respect to the voltage applied thereto, connected in series with a linear resistor, and said low pass filter is connected in parallel with said linear resistor.

7. The communication system of claim 3 including a filter network in said receiver ahead of said detector and having a pass band characteristic including said harmonically related signals.

8. The communication system of claim 1 wherein said transmission medium is water.

9. The communication system of claim 1 wherein said nonlinear detector element has a current characteristic, $$I=KV^n$$

where I is the current,
V is the applied voltage,
K is a constant, and
$n$ is an exponent greater than 1.

References Cited by the Examiner

UNITED STATES PATENTS

| | | | |
|---|---|---|---|
| 1,534,205 | 4/1925 | Fessenden | 340—5 |
| 1,954,185 | 4/1934 | Sedlmayer | 325—65 |
| 1,998,119 | 4/1935 | Cox | 332—46 |
| 2,199,190 | 4/1940 | Shore | 325—480 |
| 2,456,915 | 12/1948 | Carlson | 325—349 X |

CHESTER L. JUSTUS, *Primary Examiner.*

R. A. FARLEY, *Assistant Examiner.*